Dec. 19, 1944. S. A. DRMIC 2,365,398
PRUNING SHEARS
Filed April 26, 1943
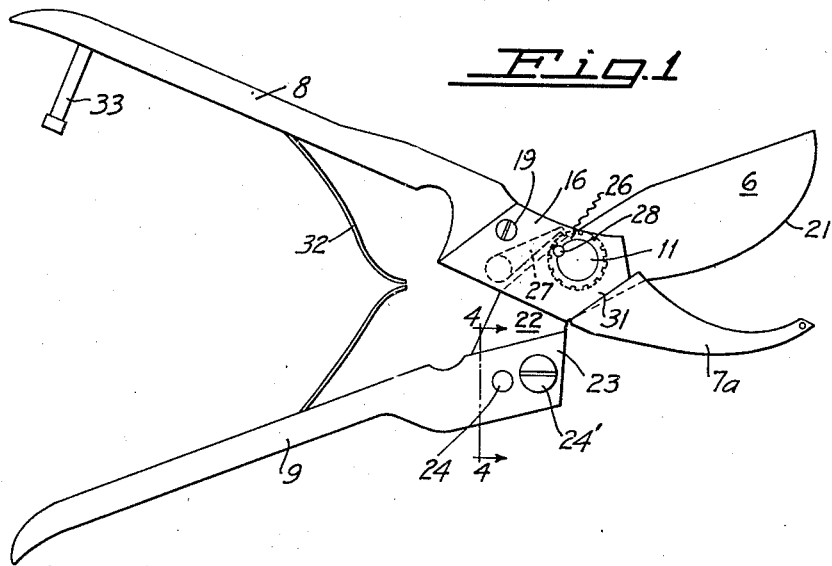
Fig.1
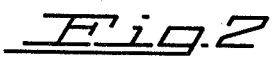
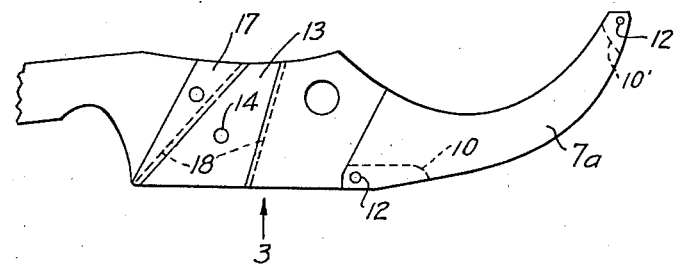
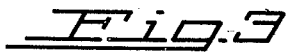
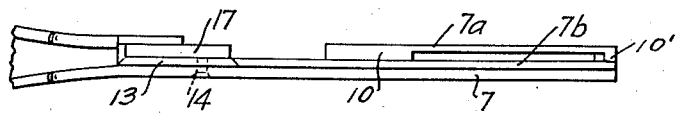
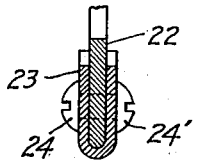
INVENTOR
Stipan A. Drmic
BY Charles S. Evaux
HIS ATTORNEY Patented Dec. 19, 1944

2,365,398

UNITED STATES PATENT OFFICE 2,365,398

PRUNING SHEARS

Stipan A. Drmic, Watsonville, Calif.

Application April 26, 1943, Serial No. 484,522

3 Claims. (Cl. 30—258)

My invention relates to pruning shears; and one of the objects of my invention is the provision of pruning shears having an improved pivotal bearing between the blades. Another object is the provision in pruning shears of an improved shear jaw.

My invention possesses other objects and features of value, some of which, with the foregoing, will be set forth in the following description of the invention. It is to be understood that I do not limit myself to the showing made by the said description and the drawing, as I may adopt variant forms of the invention within the scope of the appended claims.

In the drawing Figure 1 is a side elevation of my shears. Figures 2 and 3 are respectively side elevation and bottom view of the shear jaw and a portion of the handle thereof. Figure 4 is a cross sectional view showing the connection between the blade and its handle, the plane of section being indicated by the line 4—4 of Figure 1.

My shears comprise two main elements, a curved cutting blade or jaw 6, and a shear jaw 7 against which the blade works. These elements are fixed on handles 8 and 9 respectively, and pivoted together on the pin 11, so that the blade 6 cuts against the shear jaw when the handles are pressed together.

Sometimes in cutting a stem, there is a tendency for the cutting blade to press the stem into the plane of the blade instead of cutting it, tending to force the blade and shear jaw apart. In order to obviate this and furnish a support for the stem or branch being cut on both sides of the cutting edge, I provide a support plate 7a spaced from the main body 7 of the shear jaw by suitable spacing means 10 and 10', such as lugs formed integrally with (as illustrated) or attached to the inner face of the plate 7a adjacent its inner and outer ends respectively. The plate 7a is secured to the main body 7 of the shear jaw by rivets 12 passing through the spacing means 10 and 10'. The two parts of the shear jaw thus support the thing to be cut and permit the cutting blade to act with no resolution of forces tending to force the cutting blade and the shear jaw out of proper cutting position. With this construction a clean cut is made even with a relatively loose pivotal connection between the parts; and a snug close fit on the pivot pin 11 is not usually necessary, which of course means an easy working pair of shears.

The shear edge of the shear jaw is provided by a thin plate of tempered steel 7b welded or otherwise secured to the jaw 7 which is continuous or integral with the handle 8.

I have also found that there is a tendency to wear a hollow or dished out area immediately back of the pivot pin, probably due to the pressure of the hand at the end of a heavy cut. In order to remedy this, I provide a tempered steel wear plate 13 having beveled edges and tapered to fit a recess formed in the area where the wear usually occurs. The plate which is secured in place by a small screw 14, will resist appreciable wear over a long period but may be readily renewed at any time.

The handle 8 is preferably integral with the jaw 7, the handle being formed by folding over or doubling a part of the plate, one side being extended flat to provide the jaw. To close the end opening between the folds, and provide a seat for the bearing plate 16, I weld or otherwise fix a block 17 into the corner between the flat portion of the jaw and the folded over portion. Undercut grooves 18, formed by overhanging edge portions on the edge of the block 17 which faces the plate 7b and on the adjacent edge of the plate 7b, form a snug socket for the beveled edges of the wear plate 13. The plate 16 is shaped to fit between the doubled over portion of the handle 8 and the adjacent end of the plate 7a, as shown in Figure 1; and provides a bearing for the pin 11 and a cover upon the outer face of the jaw 7. A screw 19 holds the bearing plate in its position.

The blade 6 is formed with a cutting edge 21 having all of its bevel on one side, the opposite side adjacent the shear edge of the jaw 7 being flat. The blade is formed with a neck 22, which lies between the folded ends 23 of the handle 9. Two screws 24, entering from opposite sides fasten the blade rigidly in the handle.

Means are provided for fixing the pivot pin 11 rigid with the shear jaw 7 and handle 8, and for adjustment of the blade 6 against the shear jaw. A headed pivot pin 11 passes through the bearing plate 16, cutting blade 6, shear plate 7b and shear jaw 7 and is threaded on the end to receive the notched nut 26, held from rotating from its adjusted position by the latch 27. A pin 28 fixed in the bearing plate 16 and engaging in a notch in the edge of the pin head prevents rotation of the pivot pin.

While the close adjustment between blade and shear plate usually required is not necessary in my shears, I have nevertheless provided for such close adjustment if it should be desired. The bearing plate secured by the screw 19 is free at its opposite end 31 and capable of slight inward movement toward the shear plate so that with adjustment of the nut 26 the bearing plate may be drawn inwardly against the blade to retain it against the shear plate with the desired tension.

A pair of flat springs 32 interposed between the handles provides means for opening the shears, and a stud 33 fixed on one of the handles furnishes a stop to limit their closing. By fastening these springs to the handles with screws, a broken one may be readily replaced by the home craftsman.

I claim:

1. In shears, a cutting jaw, a shear jaw, handles fixed on each jaw, a pivot pin connecting the jaws, and a beveled edge wear plate, the shear jaw having a recess with undercut edges to receive the wear plate and located adjacent the pivot pin on the handle side thereof.

2. In shears having a shear jaw and a cutting jaw working against the side of the shear jaw, a bearing plate fixed at one end on the shear jaw and free at the other end, a pivot pin for connecting the jaws and passing through the free end of the bearing plate, and means for adjusting the effective length of the pivot pin to press the bearing plate against the cutting jaw to regulate the pressure between the jaws.

3. In shears having a shear jaw and a cutting jaw working against the side of the shear jaw, a bearing plate fixed at one end to the shear jaw and free at the other end, a pivot pin for connecting the jaws and passing through the free end of the bearing plate, means for adjusting the effective length of the pivot pin to press the bearing plate against the cutting jaw to regulate the pressure between the jaws, and means for fixing the pivot pin rigid with the shear jaw.

STIPAN A. DRMIC.